United States Patent [19]
Richardson

[11] Patent Number: 5,390,421
[45] Date of Patent: Feb. 21, 1995

[54] VEHICLE LEVEL AND CENTERLINE GAUGES

[76] Inventor: John T. Richardson, 191 SE. 10th Ct., Deerfield Beach, Fla. 33441

[21] Appl. No.: 125,293

[22] Filed: Sep. 22, 1993

[51] Int. Cl.6 .................... G01B 5/00; G01D 21/00
[52] U.S. Cl. ................................. 33/288; 33/608
[58] Field of Search .............. 33/288, 370, 371, 600, 33/608, 645

[56] References Cited

U.S. PATENT DOCUMENTS

| | | |
|---|---|---|
| 287,580 | 10/1983 | Roach . |
| 2,000,866 | 5/1935 | Smith .................................... 33/288 |
| 2,344,241 | 3/1944 | Flint . |
| 2,401,980 | 6/1946 | Smith .................................... 33/288 |
| 2,581,021 | 1/1952 | Jacobson et al. ...................... 33/288 |
| 2,713,211 | 7/1955 | Fella ...................................... 33/288 |
| 3,057,074 | 10/1962 | Sidwell . |
| 3,151,396 | 10/1964 | Junkins ................................. 33/288 |
| 3,611,575 | 10/1971 | Chartier ................................ 33/288 |
| 3,983,635 | 10/1976 | Jarman . |
| 4,006,532 | 2/1977 | Hallman ............................... 33/288 |
| 4,510,694 | 4/1985 | Boyce ................................... 33/288 |
| 5,025,567 | 6/1991 | McWilliams et al. . |

*Primary Examiner*—Thomas B. Will
*Attorney, Agent, or Firm*—Price, Gess & Ubell

[57] ABSTRACT

An elongated alignment bar mounting a level, a datum line pin and a vertical alignment pin has first and second internal conduits therein which slidably conduct independently adjustable flexible suspension chains from respective suspension points through either end of the upper surface of the bar and out respective openings in the middle of the undersurface of the bar. A chain lock secures the chains and provides a fine adjustment feature. A set of gauges features different colored alignment pins and an optional light mounting bracket to enhance alignment operations.

17 Claims, 2 Drawing Sheets

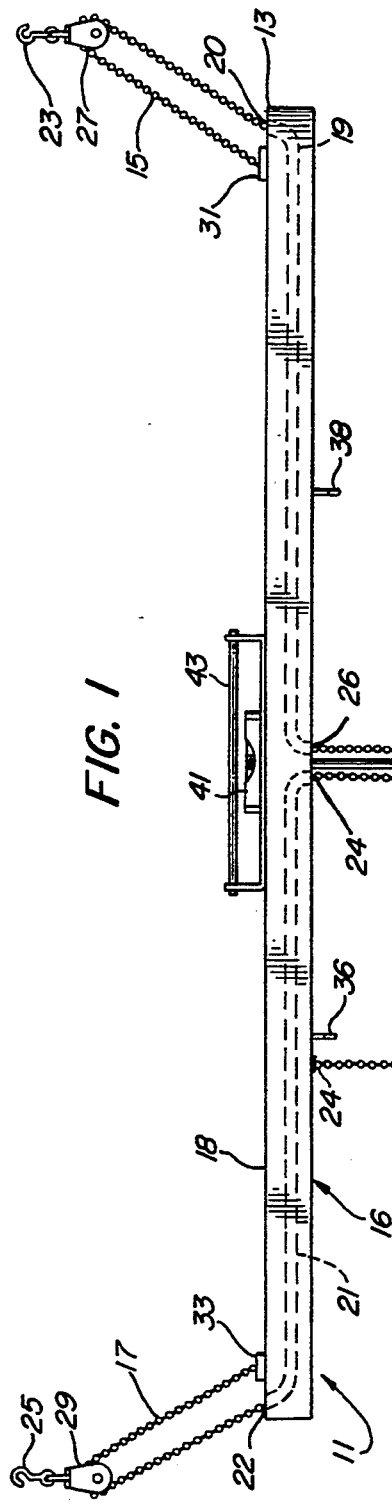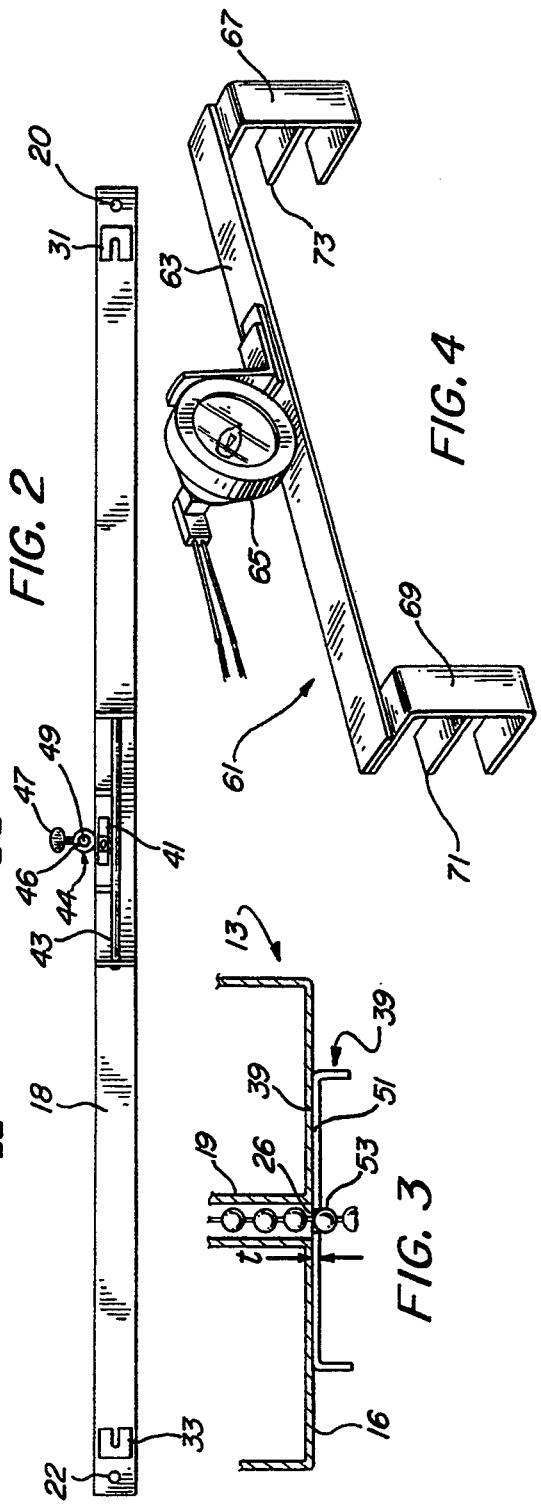

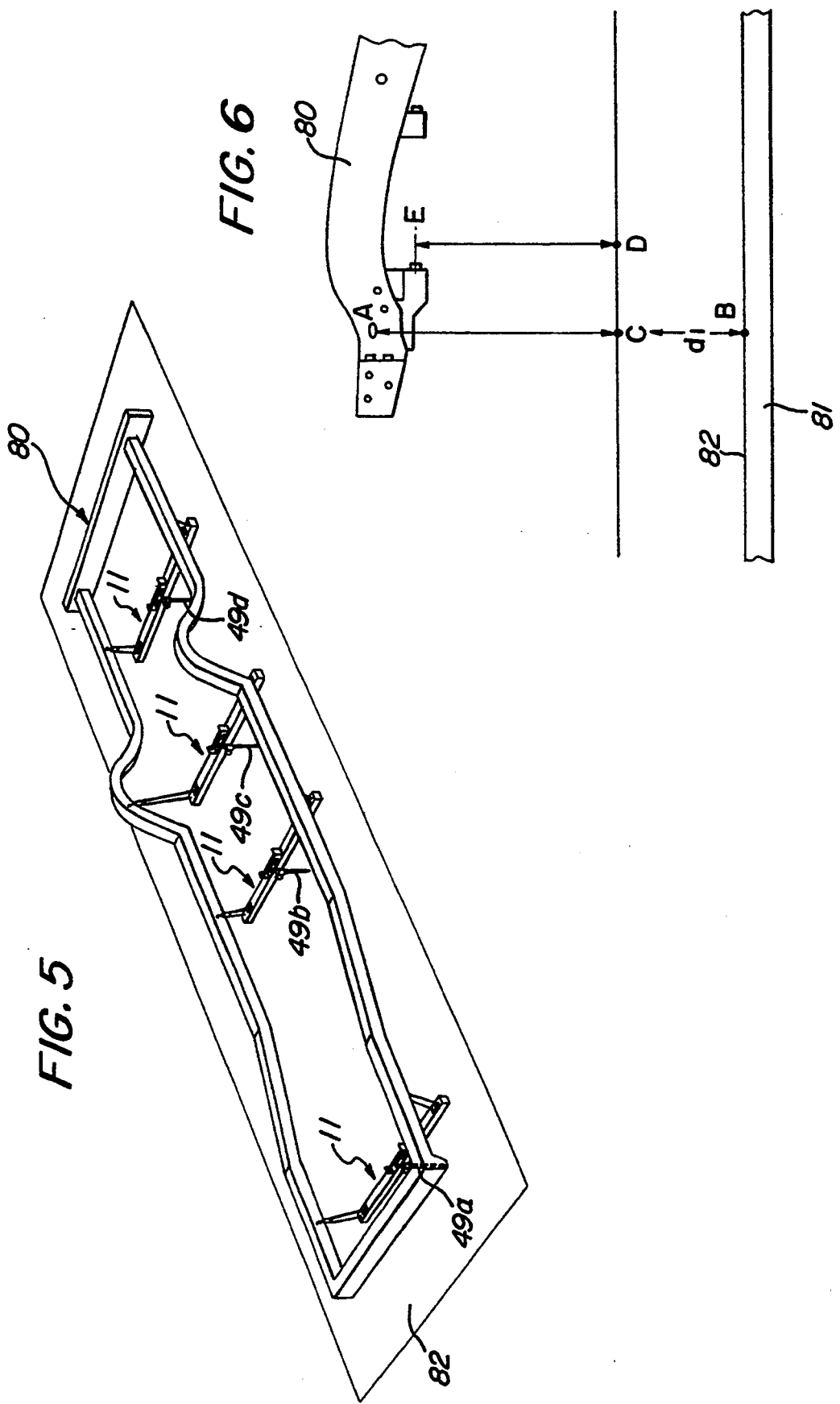

VEHICLE LEVEL AND CENTERLINE GAUGES

BACKGROUND OF THE INVENTION

1. Field of the Invention

The subject invention relates to apparatus for use in checking alignment of motor vehicle frames such as those used in automobiles and trucks.

2. Description of Related Art

Various apparatus have been proposed in the prior art for use in checking the alignment of vehicle frames. One such apparatus particularly directed to automobile frames is disclosed in Chartier, U.S. Pat. No. 3,611,575. That apparatus discloses a sling-suspended body carrying a datum member. The sling suspension is provided by a pair of flexible members, disclosed specifically as chains, which rotatably interlock with a pair of meshed gears horizontally disposed on shafts within the body. Where the automobile frame is distorted, i.e., too high or too low, the flexible chain corresponding to the location of the distortion will be too high or too low on one or both sides, depending upon the distortion. Accordingly, frame height errors are detected and corrected.

The Chartier patent exhibits many of the drawbacks generally associated with prior art frame alignment apparatus. Because of the tension applied to the flexible chains, the body tends to slide down the chains, rather than maintaining a set position beneath the automobile frame. If one of the flexible chains breaks, the entire body apparatus must be disassembled and the chain installed in a precise location to maintain equal chain length. If the internal gears are damaged from dirt or metal fragments entering through the chain opening, the unit must be sent out for repairs, and further delay may be occasioned in waiting for new parts necessary for the repairs. Other disadvantages of the Chartier device are that it is restricted to operation in connection with automobile frames and requires cumbersome auxiliary apparatus.

OBJECTS AND SUMMARY OF THE INVENTION

It is therefore an object of the invention to provide an improved vehicle frame alignment gauge;

It is another object of the invention to provide a vehicle frame alignment gauge providing both level and centerline features;

It is still another object of the present invention to provide a gauge which is virtually maintenance-free and yet provides improved accuracy over prior art approaches;

It is yet another object of the invention to provide a vehicle frame alignment gauge which may be used in aligning both automobile and truck frames; and It is another object of the invention to provide a frame alignment centerline and level gauge with improved accuracy and ease of use over the prior art, while still maintaining a minimum number of parts, inexpensive manufacturability, light weight, durability, ease of adjustment, and effectiveness in use.

According to the invention, an elongated bar is provided with first and second internal conduit means for conducting respective suspension chains from respective first openings on the top surface of the bar to respective second openings on the underside of the bar. According to the preferred embodiment, the respective first and second suspension chains are attached at either end of the elongated bar and looped over swivel pulleys and then through the conduits to emerge at respective centerline openings of the conduit on the underside of the bar. A level line pin is mounted on the top surface of the bar, while mounting means for a centerline pin is provided so that the centerline pin may be attached to depend from the bottom surface of the bar.

Additional features according to the preferred embodiments include a chain lock suspended from the bottom surface of the bar which not only holds the device in position, but also advantageously provides a fine adjustment feature. An optional light mounting bracket means is provided for mounting a light to the assembly in order to provide illumination during alignment operations. In use, four level and centerline gauges are typically used, and the centerline pins of each one are colored differently to provide more accurate alignment.

The apparatus according to the invention provides the advantageous feature that its height may be set from the middle of the device by merely pulling on the chains and then locking the chains in place with the chain lock. There are no moving parts, and each chain is independently operated. Thus, either side of the alignment device may be adjusted independently at substantially the same time from the center of the device. If a chain breaks, a replacement chain may be simply gravity fed through the internal tubing. Due to the design, the alignment device may be located more snugly to the bottom of the automobile frame and may be used with both automobiles and truck frames.

BRIEF DESCRIPTION OF THE DRAWINGS

The objects and features of the present invention, which are believed to be novel, are set forth with particularity in the appended claims. The present invention, both as to its organization and manner of operation, together with further objects and advantages, may best be understood by reference to the following description, taken in connection with the accompanying drawings.

FIG. 1 is a front elevational view of a level and centerline gauge according to the preferred embodiment;

FIG. 2 is a top view of the level and centerline gauge of FIG. 1;

FIG. 3 is an end view of a chain lock according to the preferred embodiment;

FIG. 4 illustrates a light bracket usable in conjunction with the preferred embodiment;

FIG. 5 is a perspective view illustrating gauges according to the preferred embodiment in use in conjunction with a vehicle frame; and FIG. 6 is a side schematic view illustrative of the operation of the preferred embodiment.

DETAILED DESCRIPTION OF THE PREFERRED EMBODIMENTS

The following description is provided to enable any person skilled in the art to make and use the invention and sets forth the best modes contemplated by the inventor of carrying out his invention. Various modifications, however, will remain readily apparent to those skilled in the art, since the generic principles of the present invention have been defined herein specifically to provide a centerline and level gauge which is easy to use and maintain and is readily manufacturable.

The level and centerline gauge 11 of the preferred embodiment is illustrated in FIG. 1. The gauge 11 includes an alignment pin bar 13. The bar 13 may be rectangular in cross-section and constructed of aluminum, although other cross-sectional shapes and materials, such as injection-molded or extruded plastics, may be used.

The alignment bar 13 is preferably elongated, for example, 36 inches, in length. Openings 20, 22 are provided at each end of the top surface 18 of the bar 13. The underside of the alignment bar 13 further includes two adjacent openings 24, 26 located adjacent the center portion of the alignment bar undersurface 16. A first inner conduit 19 connects the first top surface opening 20 to bottom surface opening 26, while a second internal conduit 21 connects the second upper surface opening 22 to lower surface opening 24. The inner conduits may be constructed, for example, of ¼-inch aluminum tubing.

Attached to the top surface 18 of the alignment bar 13 are respective chain stays 31, 33. Respective flexible stainless steel ball bearing chains 15, 17 are attached to the chain stays 31, 33; looped around respective swivel pulleys 27, 29; and inserted through the respective inner conduits 19 and 21. Each of the swivel pulleys 27, 29 is provided with a hook 23, 25 for attachment to the automobile frame.

The respective ball bearing chains 15, 17 exit the conduits 19, 21 at the lower undersurface openings 24, 26. The respective lower ends of the chains 15, 17 are attached to respective chain pulls 35, 37. The chain pulls 35, 37 may be cubical and, for example, ⅜-inch square in the cross-section shown in FIG. 1. The respective chains 15, 17 are preferably six-foot-long, 3/16-inch stainless steel ball bearing chains, although various other types of flexible members, including various other chain or rope structures might be used.

Various alignment devices are mounted in connection with the alignment bar 13. The top surface 18 of the alignment bar 13 carries a level 41, which may be, for example, a ¼-inch × 3-inch-long level, as well as a level line pin 43 which is, for example, ¼-inch × 8 inches long. The level line pin 43 provides a datum line, while the level 41 provides an alignment indication during installation, as described in more detail hereafter. As shown in FIG. 2, a pin holder 44 having a center opening 46 and a lock screw 47 is provided to suspend a centerline pin 49 to extend vertically downward and away from the undersurface of the alignment bar 13. The centerline pin 49 may also be inverted to extend above the bar 13, if desired. Chain lock 39 is suspended by a chain attached to a bracket 24.

In operation, the gauge 11 is suspended from selected points of the automobile frame by appropriate attachment of the hooks 23, 25. The chain pulls 35, 37 are manually grasped and pulled to independently adjust each side of the gauge 11 to a desired height. When the desired position is reached, the chain lock 39 is installed. Each chain 15, 17 is inserted into the central groove 40 of the chain lock 39. Gravity then causes the top surface of the chain lock 39 to abut the bottom surface 16 of the alignment bar 13, as shown in FIG. 3.

As also shown in FIG. 3, the chain lock 39 is constructed to provide a fine adjustment of the height of the alignment bar 13. In particular, the thickness "t" of the lip 51 of the chain lock 39 may be selected to be the radius of one of the balls 53, for example, 3/32-inch, thereby providing a fine adjustment of one-half the radius of a ball in the adjustment height of the bar 13. After the chain lock 39 is in place, there is an excess length of each of the respective chains 15, 17 extending beneath the alignment bar 13. This excess length is accommodated by chain holders or hooks 36, 38 attached to the undersurface of the alignment bar 13 and spaced at an appropriate distance from the openings 24, 26. To accommodate the excess length, the chain pulls 35, 37 are gripped, and the ends of chains 15, 17 are draped across the respective chain holders 36, 38.

FIG. 4 illustrates a light bracket 61 adapted for use in conjunction with the preferred embodiment of FIGS. 1–3. The light bracket 61 includes a horizontal cross member 63 to which are attached respective vertical frame members 67, 69. Each vertical member 67, 69 has attached thereto a respective U-shaped bracket 71, 73. The brackets 71, 73 are shaped to snugly or press fit onto the alignment bar 13.

The light bracket 61 mounts a light 65, which is centrally positioned and attached to the horizontal member 63. The design of the light bracket 61 is such that the light 65 may be disposed either above or below the alignment bar 13 of FIG. 1 by simply inverting the manner in which the bracket 61 is attached. The light 65 is thus elevated out of the line of sight of both the level line and the centerline. The light 65 preferably has a rechargeable power pack, or, alternatively, may be powered from a 12-volt transformer and wall plug.

As may be appreciated, the gauge 11, according to the preferred embodiment, is particularly suited for use with an auto collision frame machine. FIG. 5 illustrates a set of four centerline and level gauges 11 according to the preferred embodiment installed on an automobile frame 80. The frame 80 is disposed above a frame machine 81 (FIG. 6) which provides a known level plane 82.

Based upon given adjustment data, the datum line established by the level line pin 43 of each gauge 11 is located a selected distance above the known level provided by the frame machine. As known in the art and illustrated in FIG. 6, different datum line points such as C and D establishing various datum lines such as A–C and E–D are provided down the frame 80 for setting each gauge 11. For example, assume that the specified datum line A–C in FIG. 6 is 15 inches. The operator then measures the distance A–B from hang point A to the plane 82 of the frame machine 81. Assume that this measurement A–B is 20 inches. The level line 41 of a gauge 11 suspended from point A is located 20 minus 15 or a distance $d_1$ of 5 inches above the plane 82 of the frame machine 81. As each gauge 11 is installed on the frame by an operator, the operator observes the level 41 when the chains on each side of the gauge 41 are adjusted to be equal. If the level bubble indicates unlevel, an indication that the datum line is off is provided while the particular gauge is being hooked up.

The accuracy and ease of use of the level and centerline gauge of the preferred embodiment is substantially enhanced by employing different colors for the respective centerline pins 49. Preferably, the front pin 49a is white, and the pins 49b, 49c, 49d behind it are respectively and successively red, blue and green. The use of fluorescent colors further enhances the ability to visibly detect the alignment of the center pins 49a–d. The level line pins 43 of the respective gauges may also be similarly varied in color to enhance accuracy of the apparatus. Additionally, every 20th ball of the respective flexible chains 15, 17 may be colored bright yellow to provide visually-detectable references at each side of the frame 80. The swivel hooks 23, 25 automatically equalize the angles which the respective flexible chains 15, 17 make with the frame. Since the gauges 11 employ their own built-in datum line, the apparatus according to the preferred embodiment avoids having to use an additional unit to locate the datum line as in some prior art devices. Set-up time is thus much faster.

Those skilled in the art will appreciate that various adaptations and modifications of the just-described preferred embodiment can be configured without departing from the scope and spirit of the invention. Therefore, it is to be understood that, within the scope of the appended claims, the invention may be practiced other than as specifically described herein.

What is claimed is:

1. Vehicle frame alignment apparatus comprising:
   a hollow, elongated bar having a top and bottom surface, a first pair of openings in the top surface and a second pair of openings in the bottom surface, the second pair of openings being located near the center of said bar;
   a first conduit means located within said bar for providing a first enclosed path between one of said first pair of openings and one of said second pair of openings;
   a second conduit means located within said bar for providing an enclosed path between the other one of said first pair of openings and the other one of said second pair of openings; and
   respective first and second suspension chain means independently freely slidable within said first and second conduit means, respectively, for providing height adjustment of said bar;
   said first chain means slidably entering said one of said first pair of openings from a first point outside said bar, slidably passing through said first conduit means, and slidably exiting through said one of said second pair of openings;
   said second chain means slidably entering said other one of said first pair of openings from a second point outside said bar, slidably passing through said second conduit means, and slidably exiting through said other one of said second pair of openings.

2. The apparatus of claim 1 wherein a respective one of said first pair of openings is located at a respective end of said bar and said first conduit means comprises a first hollow tube connected between said one of said first pair of openings and said one of said second pair of openings, and said second conduit means comprises a second hollow tube connected between said other one of said first pair of openings and said other one of said second pair of openings, respectively.

3. The apparatus of claim 1 further including a horizontally-disposed level line pin means mounted on the top surface of the bar for establishing a datum line with respect to a known level surface.

4. The apparatus of claim 3 further including a centerline pin and mounting means for mounting the centerline pin such that it depends from the bottom surface of the bar.

5. The apparatus of claim 4 further including a chain lock means for fixing the position of said first and second suspension chain means.

6. The apparatus of claim 5 wherein said first and second suspension chain means comprises a respective first and second ball bearing chain and wherein said chain lock means includes means cooperating with said first and second ball bearing chains to provide fine adjustment of said height.

7. The apparatus of claim 6 wherein said fine adjustment means comprises a bottom surface on said chain lock means which is one-half the thickness of a ball of one of said first and second ball bearing chains.

8. The apparatus of claim 5 further including a light mounting bracket means for mounting a light to said bar.

9. The apparatus according to claim 2 wherein said bar has right and left halves and wherein said first tube extends horizontally through substantially the entire left half of said bar, while said second tube extends horizontally through substantially the entire right half of said bar.

10. The apparatus of claim 6 wherein said chain lock means is suspended from the bottom surface of said bar.

11. The apparatus of claim 1 wherein said first and second conduit means and first and second suspension chain means cooperate to enable gravity feeding of said first and second suspension chain means through said first and second conduit means.

12. The apparatus of claim 11 further including respective chain holders on either side of said second pair of openings.

13. Means for establishing the central datum line of an automobile frame comprising:
    an elongated, hollow alignment bar;
    means in said bar defining first and second paths therethrough for the slidable passage of a respective one of a pair of flexible members such that each member independently slidably passes freely through its respective path so as to enable gravity feeding of each said flexible member through its respective path;
    a pair of flexible members extending and slidably movable through each of said paths;
    said two flexible members being designed and constructed to suspend said bar along a line transverse to the fore and aft axis of the frame;
    means preventing movement of said flexible members relative to said bar under the weight of said bar when said flexible members are suspending said bar;
    means for attaching said respective flexible members to mutually opposite locations on an automobile frame; and
    a datum or sighting member mounted on said bar.

14. Vehicle frame alignment apparatus comprising:
    an elongated, hollow bar having a top and bottom surface, a first pair of openings, one at each end of the top surface, and a second pair of openings in the bottom surface, the second pair of openings being located near the center of said bar;
    a first conduit means for providing a first enclosed path between one of said first pair of openings and one of said second openings;
    a second conduit means for providing an enclosed path between the other one of said first pair of openings and the other one of said second pair of openings; and
    respective first and second suspension chain means comprising a string of balls of uniform diameter independently slidable within the respective first and second conduit means for providing height adjustment of said bar;
    said first chain means slidably entering said one of said first pair of openings from a first point outside said bar, slidably passing through said first conduit means, and slidably exiting through said one of said second pair of openings;

said second chain means slidably entering said other one of said first pair of openings from a second point outside said bar, slidably passing through said second conduit means, and slidably exiting through said other one of said second pair of openings;

a horizontal level line pin mounted on said top surface;

mounting means for mounting a centerline pin such that it depends from the bottom surface of the bar; and a chain lock means having a bottom surface and a slot therein for receiving said first and second chain means adjacent said second pair of openings, said bottom surface of said chain lock means being of a thickness one-half the diameter of said balls for cooperating with said balls to provide a fine height adjustment of said suspension chains, whereby the height of said alignment bar may be set by pulling on said chains at the middle of said bar and locking them in place with said chain lock means.

15. Vehicle frame alignment apparatus comprising:

a hollow, elongated bar having a top and bottom surface, a first pair of openings in the top surface and a second pair of openings in the bottom surface, the second pair of openings being located near the center of said bar;

a first conduit located within said bar and providing a first enclosed path between one of said first pair of openings and one of said second pair of openings;

a second conduit located within said bar and providing an enclosed path between the other one of said first pair of openings and the other one of said second pair of openings; and respective first and second flexible members independently freely slidable within said first and second conduits, respectively, for providing height adjustment of said bar independently;

said first flexible member slidably entering said one of said first pair of openings from a first position outside said bar, slidably passing through said first conduit, and slidably exiting through said one of said second pair of openings;

said second flexible member slidably entering said other one of said first pair of openings from a second point outside said bar, slidably passing through said second conduit, and slidably exiting through said other one of said second pair of openings.

16. The vehicle frame alignment apparatus comprising: a plurality of alignment gauges, each comprising:

a hollow, elongated bar having a top and bottom surface, a first pair of openings in the top surface and a second pair of openings in the bottom surface, the second pair of openings being located near the center of said bar;

a first conduit means located within said bar for providing a first enclosed path between one of said first pair of openings and one of said second pair of openings;

a second conduit means located within said bar for providing an enclosed path between the other one of said first pair of openings and the other one of said second pair of openings;

respective first and second suspension chain means independently freely slidable within said first and second conduit means, respectively, for providing height adjustment of said bar;

said first chain means slidably entering said one of said first pair of openings from a first point outside said bar, slidably passing through said first conduit means, and slidably exiting through said one of said second pair of openings;

said second chain means slidably entering said other one of said first pair of openings from a second point outside said bar, slidably passing through said second conduit means, and slidably exiting through said other one of said second pair of openings;

a centerline pin; and mounting means for mounting the centerline pin such that it depends from the bottom surface of the bar.

17. The apparatus of claim 16 wherein said plurality is four and the centerline pin of each respective alignment gauge is colored differently from the centerline pin of any other gauge to provide more accurate alignment.

* * * * *